US 9,553,630 B2

United States Patent
Uejima

(10) Patent No.: US 9,553,630 B2
(45) Date of Patent: Jan. 24, 2017

(54) SWITCHING MODULE AND WIRELESS COMMUNICATION EQUIPMENT

(71) Applicant: Murata Manufacturing Co., Ltd., Nagaokakyo-shi, Kyoto-fu (JP)

(72) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/737,713

(22) Filed: Jun. 12, 2015

(65) Prior Publication Data

US 2015/0280774 A1    Oct. 1, 2015

Related U.S. Application Data

(63) Continuation of application No. PCT/JP2013/080384, filed on Nov. 11, 2013.

(30) Foreign Application Priority Data

Dec. 18, 2012    (JP) ................. 2012-275599

(51) Int. Cl.
*H04B 1/44*    (2006.01)
*H04B 1/00*    (2006.01)
(Continued)

(52) U.S. Cl.
CPC .............. *H04B 1/44* (2013.01); *H04B 1/006* (2013.01); *H04B 1/0458* (2013.01); *H04B 1/18* (2013.01); *H04B 1/40* (2013.01); *H04M 1/0202* (2013.01)

(58) Field of Classification Search
CPC ............... H04B 1/44; H04B 1/48; H04B 1/50; H04B 1/525
(Continued)

(56) References Cited

U.S. PATENT DOCUMENTS

2010/0091752 A1*  4/2010  Kemmochi ............ H03H 7/09
                                                            370/339
2010/0117713 A1   5/2010  Katoh et al.

FOREIGN PATENT DOCUMENTS

JP      2002-033714 A    1/2002
JP      2006-121211 A    5/2006
(Continued)

OTHER PUBLICATIONS

Official Communication issued in International Patent Application No. PCT/JP2013/080384, mailed on Feb. 4, 2014.
(Continued)

Primary Examiner — Lee Nguyen
(74) Attorney, Agent, or Firm — Keating & Bennett, LLP

(57) ABSTRACT

A switching module includes a common terminal, individual terminals connected to respective corresponding signal paths, and a switch portion that selectively switches and connects the common terminal to one of the individual terminals. The switch portion includes first switches and at least one second switch, each first switch being connected to the common terminal at one end portion within the switch, the at least one second switch being connected to the common terminal at one end portion via a connection wiring electrode provided on a wiring board. This does not allow directional connection between the one end portion of the second switch and the common terminal within the switch. Thus, mutual interference between a communication signal transmitted through the first switch and a communication signal transmitted through the second switch is prevented.

19 Claims, 6 Drawing Sheets

(51) Int. Cl.
*H04M 1/02* (2006.01)
*H04B 1/40* (2015.01)
*H04B 1/04* (2006.01)
*H04B 1/18* (2006.01)
*H04B 1/38* (2015.01)

(58) Field of Classification Search
USPC .............................. 455/78, 82, 552.1, 553.1
See application file for complete search history.

(56) References Cited

FOREIGN PATENT DOCUMENTS

| | | |
|---|---|---|
| JP | 2010-114837 A | 5/2010 |
| JP | 2010-212962 A | 9/2010 |
| JP | 2012-070267 A | 4/2012 |
| JP | 2012-080247 A | 4/2012 |
| WO | 2012/153800 A1 | 11/2012 |

OTHER PUBLICATIONS

Official Communication issued in corresponding German Patent Application No. 11 2013 006 057.4, mailed on Nov. 2, 2015.

* cited by examiner

US 9,553,630 B2

SWITCHING MODULE AND WIRELESS COMMUNICATION EQUIPMENT

BACKGROUND OF THE INVENTION

1. Field of the Invention

The present invention relates to a switching module configured to handle transmission and reception of multiband communication signals, and wireless communication equipment including this switching module.

2. Description of the Related Art

Recent cellular phones facilitate phone calls and achieve high-speed communications of large-volume data by being configured to enable communications in a plurality of communication standards such as Global System for Mobile communications (GSM: Registered Trademark) standard, Wideband Code Division Multiple Access (W-CDMA) standard, Long Term Evolution (LTE) standard, and the like. In this case, a plurality of communication signals in different frequency bands is being transmitted through inside the cellular phone. Thus, in a conventional technology, as illustrated in FIG. 8, a switching module 100 capable of switching and connecting a common antenna 101 to one of a plurality of signal paths corresponding to the respective communication signals is proposed (Japanese Unexamined Patent Application Publication No. 2002-33714).

The switching module 100 is a module that handles transmission and reception of a communication signal in a 2.4 GHz band and transmission and reception of a communication signal in a 5 GHz band. The switching module 100 includes a 2.4 GHz band front end circuit 102a, a 5 GHz band front end circuit 102b, a bandpass filter 103 shared by both the front end circuits, and a switch 104 that selectively connects one of both the front end circuits 102a and 102b to the common antenna 101 and the bandpass filter 103.

Further, the 2.4 GHz band front end circuit 102a is composed of a voltage controlled oscillator (VCO) 105a for local oscillation, an up-converter mixer 106a1 for use at the time of transmission, a down-converter mixer 106a2 for use at the time of reception, a power amplifier 107a1 for transmission, a low noise amplifier 107a2 for reception, and a switch 108a for switching transmission and reception.

Similarly, the 5 GHz band front end circuit 102b is composed of a voltage controlled oscillator (VCO) 105b for local oscillation, an up-converter mixer 106b1 for use at the time of transmission, a down-converter mixer 106b2 for use at the time of reception, a power amplifier 107b1 for transmission, a low noise amplifier 107b2 for reception, and a switch 108b for switching transmission and reception.

However, in this kind of switching module, there are cases where, when a communication signal is inputted to a switch or a splitter (duplexer), harmonic emissions (for example, second-order harmonics or third-order harmonics) of the communication signal are generated as spurious emissions. In the switching module 100 that handles a plurality of communication signals in different frequency bands, there is a possibility that the harmonic components generated at the time of inputting a communication signal to the switch may interfere with another communication signal and degrade communication characteristics of the another communication signal. In view of this, the foregoing switching module 100 is provided with the switch 104 as well as the switches 108a and 108b that are separately provided for the respective front end circuits 102a and 102b. This separates the signal path of the 2.4 GHz band communication signal and the signal path of the 5 GHz band communication signal, and prevents mutual interference of the communication signals in both the bands.

However, in the conventional switching module 100, the switches 108a and 108b are provided for each pair of the front end circuits 102a and 102b, through which the communication signals in different frequency bands are being transmitted, respectively. This makes it difficult to meet the need of simplification and downsizing of switching modules associated with recent downsizing of cellular phones. To simplify and downsize switching modules, it is possible to configure the switch portions 104, 108a, and 108b provided for the different bands using a single IC. However, in such a configuration, the switch portions 104, 108a, and 108b that switch and connect the communication signals in different frequency bands are arranged in close proximity to each other. Further, all the switch portions 104, 108a, and 108b are connected to a common antenna terminal within the IC. Thus, harmonic components generated at one of the switch portions are likely to leak to another switch portion or the signal path connected to that switch portion, and the interference may occur between different bands.

Further, some cellular phones in recent years are provided with an antenna for a different communication system such as, for example, a global positioning system (GPS), a GSM, and the like. In such a case, harmonics of an 850 MHz band signal in GSM may overlap the frequency of GPS signal in some cases, and the reception sensitivity of GPS may degrade if such harmonics are inputted via an antenna for GPS.

Further, in the case where a plurality of switches is included in a single switch IC, redesigning of the switch IC may be required every time the design of a switching module is changed. This increases the manufacturing cost.

SUMMARY OF THE INVENTION

Preferred embodiments of the present invention provide a switching module that facilitates and simplifies design changes and prevents interference between bands while achieving downsizing and simplification of components.

A switching module according to a preferred embodiment of the present invention includes a plurality of signal paths that transmit and receive a plurality of communication signals in different frequency bands, the switching module including a wiring board; and a switch IC mounted on the wiring board, the switch IC including a common terminal, a plurality of individual terminals connected to respective corresponding signal paths, and a switch portion that selectively switches and connects the common terminal to one of the individual terminals, wherein the switch portion includes a plurality of first switches and at least one second switch, each first switch being connected to the common terminal within the switch IC at one end portion and to the individual terminal corresponding thereto at another end portion, the at least one second switch being not connected to the plurality of first switches within the switch IC and being connected to the common terminal via a connection wiring electrode provided on the wiring board at one end portion and to the individual terminal corresponding thereto at another end portion within the switch IC.

The foregoing configuration enables the single switch IC to selectively switch and connect the common terminal to one of the plurality of signal paths through which communication signals in different frequency bands are transmitted. Thus, the switching module is able to be downsized and simplified, compared with configurations where switch portions are respectively provided for different bands.

Further, the switch portion includes the plurality of first switches and the at least one second switch, each first switch being connected to the common terminal within the switch IC at one end portion and to the individual terminal corresponding thereto at another end portion, the at least one second switch being not connected to the plurality of first switches within the switch IC and being connected to the common terminal via the connection wiring electrode provided on the wiring board at one end portion and to the individual terminal corresponding thereto at another end portion within the switch IC. This makes the first switch and the second switch electrically independent within the switch IC, thus reducing the amounts of mutual leaking of the communication signals, which are being transmitted through the first switch and the second switch. Accordingly, the mutual interference of communication signals that are likely to interfere with each other is prevented by separately transmitting these communication signals through the first switch and the second switch.

Further, providing a plurality of the second switches enables selecting one of the plurality of the second switches to transmit a communication signal that may interfere with another communication signal. This improves flexibility in selecting the second switch to transmit the communication signal, and facilitates and simplifies design changes in the switching module.

Further, the communication signals may include one communication signal whose harmonic component interferes with another communication signal, and the one communication signal may be transmitted through the signal path connected to the second switch whereas the another communication signal may be transmitted through one of the signal paths connected to the respective first switches. According to the foregoing configuration, even in the case where the harmonic component is generated when the one communication signal flows into the second switch, the interference between the harmonic component and the another communication signal is prevented.

Further, a filter circuit that attenuates the harmonic component of the one communication signal may be provided in a path connecting the common terminal and the second switch through which the one communication signal is transmitted. According to the foregoing configuration, the harmonic component of the one communication signal (transmission signal), which is generated at the second switch or the like, may be attenuated by the filter circuit before the one communication signal is transmitted to the common terminal. This further improves the effect of preventing the interference between the harmonic component of the one communication signal and the another communication signal.

Further, the switch IC may include a plurality of the second switches, and, of the plurality of the second switches, at least two of the second switches may be connected in parallel. According to the foregoing configuration, the load voltages of the respective second switches connected in parallel may be lowered compared with the case where a communication signal is transmitted through the single switch. This suppresses spurious signals such as the harmonics and the like generated at the time of transmitting the communication signal through the second switch.

Further, the second switches may be connected in parallel by a wiring electrode provided on the wiring board. According to this configuration, the second switches to be connected in parallel may be arbitrarily selected on the wiring board side. This enables the single switch IC to handle a plurality of switching modules.

Further, the switches may each include field effect transistors. According to this configuration, various preferred embodiments of the present invention may be applied to switch ICs in which each switch includes field effect transistors.

Further, wireless communication equipment including a switching module according to one of various preferred embodiments of the present invention includes first and second antennas, wherein the first antenna transmits and receives at least one of the communication signals, and the second antenna transmits and receives a communication signal that interferes with a harmonic component of the at least one of the communication signals. According to the foregoing configuration, the switching module according to various preferred embodiments of the present invention may be used in the wireless communication equipment including two antennas.

Further, for example, in a case where the first antenna is connected to the common terminal of the switching module, a communication signal whose harmonic components interfere with a communication signal transmitted and received by the second antenna is transmitted through the second switch, and a filter that attenuates the harmonic components of the communication signal transmitted through the second switch is provided in a path connecting the second switch and the common terminal, the harmonic component of the communication signal transmitted through the second switch is attenuated by the filter. Thus, the harmonic component may not be inputted via the second antenna, thus providing the wireless communication equipment with excellent communication characteristics.

According to various preferred embodiments of the present invention, the switch portion included in the switch IC includes the plurality of first switches and the at least one second switch, each first switch being connected to the common terminal within the switch IC at one end portion and to the individual terminal corresponding thereto at another end portion, the at least one second switch being connected to the common terminal via a connection wiring electrode provided on the wiring board at one end portion and to the individual terminal corresponding thereto at another end portion within the switch IC. Thus, the one end portion of the second switch is not directly connected to the common terminal or the first switch within the IC, thus significantly reducing the amounts of mutual leaking of the communication signals, which are being transmitted through the first switch and the second switch. Accordingly, the mutual interference of communication signals that are likely to interfere with each other are prevented by separately transmitting these communication signals through the first switch and the second switch.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
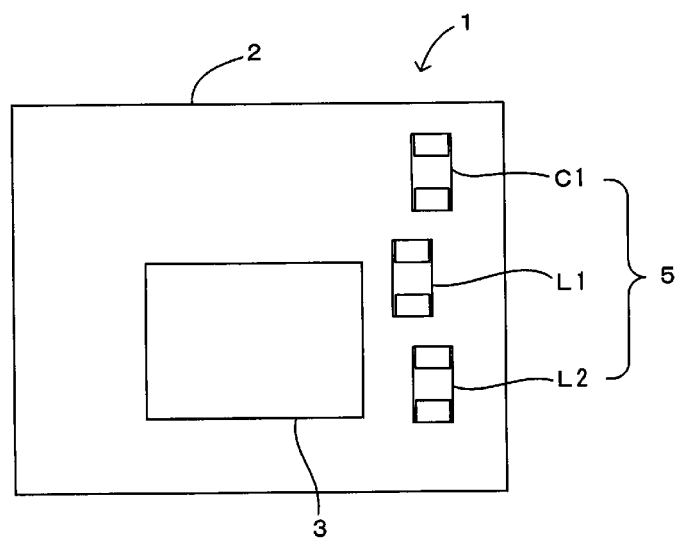
FIG. 1 is a plan view of switching module according to a first preferred embodiment of the present invention.
Figure 2:
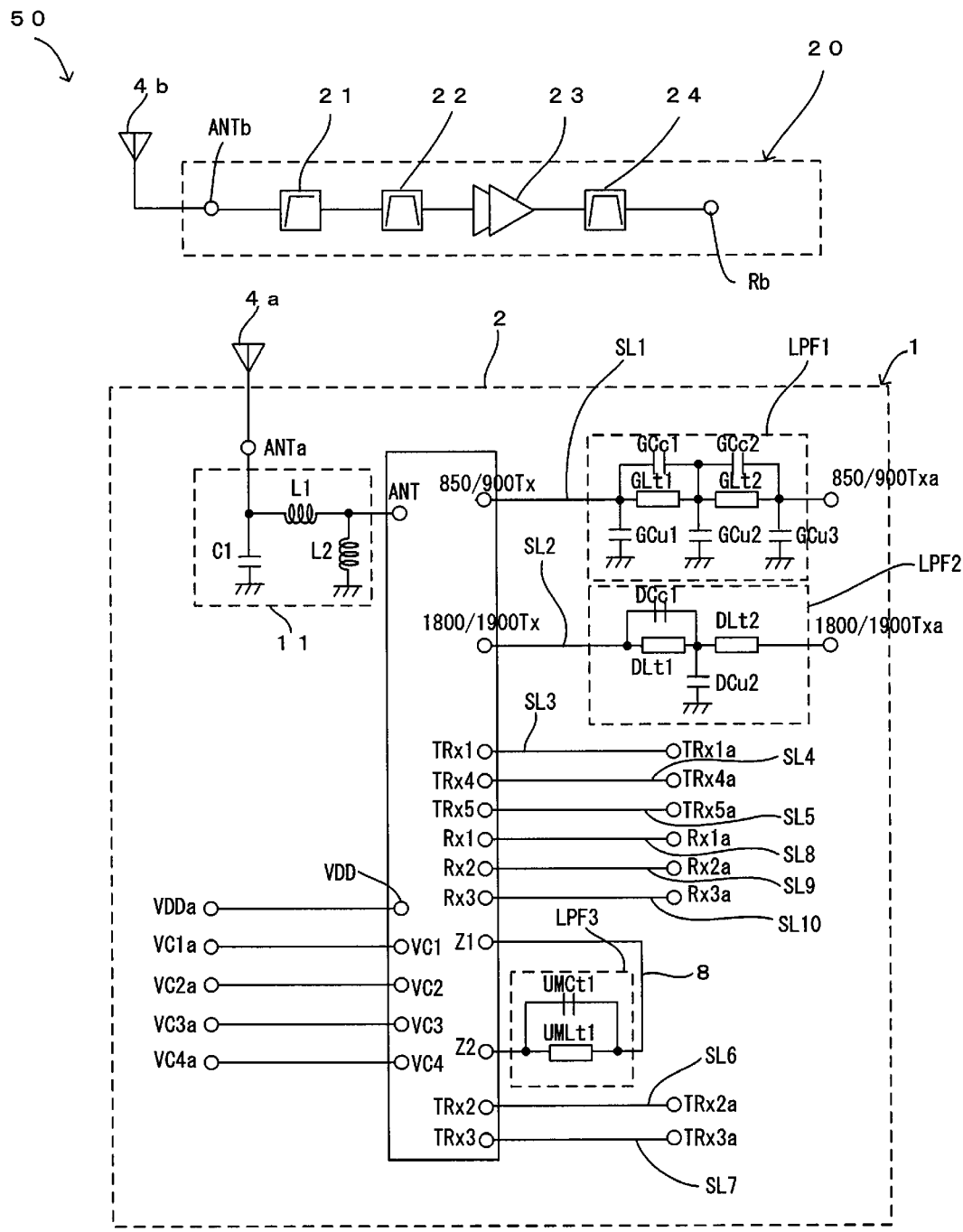
FIG. 2 is a circuit configuration diagram of a wireless communication equipment including a switching module of FIG. 1.
Figure 3:
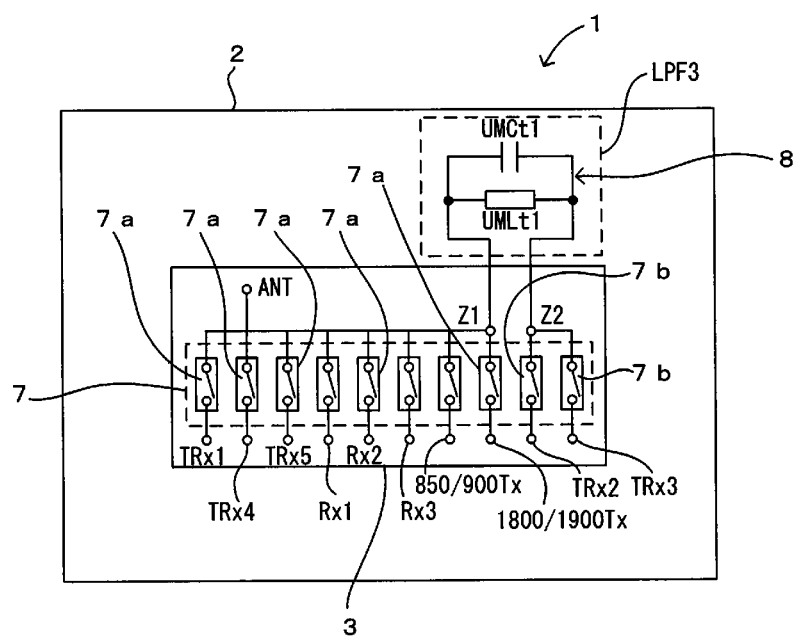
FIG. 3 is a view illustrating internal structure of a switch IC.

A switching module 1 according to a first preferred embodiment of the present invention is described with reference to FIG. 1 to FIG. 3. FIG. 1 is a plan view of the switching module 1, FIG. 2 is a circuit configuration diagram of a wireless communication equipment including the switching module 1 of FIG. 1, and FIG. 3 is a view illustrating the internal structure of a switch IC included in the switching module 1. To simplify the description, in FIG. 1 and FIG. 3, power terminals and control terminals that supply power and control signals to a switch IC 3 and some of wiring electrodes located on a wiring board 2 are not illustrated in the drawings.

The switching module 1 according to the present preferred embodiment is a module to be mounted in a cellular phone or the like, that transmits and receives a plurality of communication signals in different frequency bands. As illustrated in FIG. 1 and FIG. 2, the switching module 1 includes the wiring board 2, the switch IC 3 mounted on the wiring board 2, and chip components 5 that define a matching circuit 11 that performs impedance matching between an external first antenna 4a and a common terminal ANT of the switch IC 3. The switch IC 3 enables transmission and reception of multiband communication signals by switching and connecting the common terminal ANT, which is connected to the first antenna 4a, to one of signal paths SL1 to SL10 that are provided for respective communication signals.

Specifically, the switching module 1 includes a signal path SL1 to transmit communication signals in a 850 MHz band (824 MHz to 849 MHz: GSM850) and a 900 MHz band (880 MHz to 915 MHz: GSM900), a signal path SL2 to transmit communication signals in a 1800 MHz band (1710 MHz to 1785 MHz: GSM1800) and a 1900 MHz band (1850 MHz to 1910 MHz: GSM1900), a signal path SL3 to transmit and receive communication signals in Band 1 (uplink frequency: 1920 MHz to 1980 MHz, downlink frequency: 2110 MHz to 2170 MHz), a signal path SL4 to transmit and receive communication signals in Band 2 (uplink frequency: 1850 MHz to 1910 MHz, downlink frequency: 1930 MHz to 1990 MHz), a signal path SL5 to transmit and receive communication signals in Band 8 (uplink frequency: 880 MHz to 915 MHz, downlink frequency: 925 MHz to 960 MHz), a signal path SL6 to transmit and receive communication signals in Band 5 (uplink frequency: 824 MHz to 849 MHz, downlink frequency: 869 MHz to 894 MHz), and a signal path SL7 to transmit and receive communication signals in Band 13 (uplink frequency: 777 MHz to 787 MHz, downlink frequency: 746 MHz to 756 MHz) as well as a plurality of signal paths SL8 to SL10 that include a signal path to receive communication signals (1574.42 MHz to 1576.42 MHz) from a global positioning system (GPS). The switching module 1 is configured to handle transmission and reception of the communication signals in different frequency bands described above by selectively switching and connecting the common terminal ANT of the switch IC 3, which will be described below, to one of a plurality of individual terminals 850/900Tx, 1800/1900Tx, TRx1 to TRx5, and Rx1 to Rx3, which correspond to the respective communication paths SL1 to SL10 and are connected to the respective communication paths SL1 to SL10. Hereinafter, the individual terminals 850/900Tx, 1800/1900Tx, TRx1 to TRx5, and Rx1 to Rx3 may be collectively referred to as individual terminals 6.

The wiring board 2 is a multilayer board composed of, for example, a glass epoxy resin, a low temperature co-fired ceramic (LTCC), a glass, or the like. Further, wiring electrodes and via-conductors (not illustrated in the drawings) composed of a conductive material such as Cu are formed on front and back surfaces of the wiring board 2 and inside thereof. Further, these wiring electrodes and via-conductors define the signal paths SL1 to SL10, a connection wiring electrode 8 which will be described below, and low pass filters LPF 1 to LPF 3. Further, on the front surface of the wiring board 2, the individual terminals 6 of the switch IC 3 and a plurality of mounting electrodes (not illustrated in the drawing) to be connected with other terminals ANT, VDD, and VC1 to VC4 are formed. On the back surface of the wiring board 2, a plurality of outer electrodes ANTa, 850/900Txa, 1800/1900Txa, TRx1a to TRx5a, Rx1a to Rx3a, VDDa, VC1a to VC4a, which are connected to the corresponding mounting electrodes via the wiring electrodes and the via-conductors, are configured to connect the switching module 1 and an external mother board (not illustrated in the drawings) or the like.

As described above, the signal paths SL1 to SL10 each preferably include the wiring electrode and the via-conductor that are located on the wiring board 2. For example, the signal path SL1 includes the via-conductor and the wiring electrode connecting the outer electrode 850/900Txa and the mounting electrode connected to the individual terminal 850/900Tx of the switch IC 3. The signal path SL2 includes the via-conductor and the wiring electrode connecting the outer electrode 1800/1900Txa and the mounting electrode connected to the individual terminal 1800/1900Tx of the switch IC. Similarly, the other signal paths SL3 to SL10 each include the via-conductor and the wiring electrode connecting the outer electrode and the corresponding mounting electrode. The signal path SL1 and the signal path SL2 for transmission are provided with the low pass filters LPF1 and LPF2, respectively.

As illustrated in FIG. 2, the low pass filter LPF1 includes two inductor elements GLt1 and GLt2 and five capacitor elements GCc1, GCc2, GCu1, GCu2, and GCu3. These elements GLt1, GLt2, GCc1, GCc2, GCu1, GCu2, and GCu3 define a filter circuit that attenuates harmonic components (second-order harmonics and third-order harmonics in this preferred embodiment) and the like of transmission signals in the 850 MHz band and the 900 MHz band. These elements GLt1, GLt2, GCc1, GCc2, GCu1, GCu2, and GCu3 include the wiring electrodes and the via-conductors located on the wiring board 2.

Similarly, the low pass filter LPF2 includes two inductor elements DLt1 and DLt2 and two capacitor elements DCc1 and DCu2. These elements DLt1, DLt2, DCc1, and DCu2 define a filter circuit that attenuates harmonic components and the like of transmission signals in the 1800 MHz band and the 1900 MHz band. As is the case with the low pass filter LPF1, these elements DLt1, DLt2, DCc1, and DCu2 include the wiring electrodes and the via-conductors located on the wiring board 2. As an alternative configuration, a portion or all of the inductor elements and capacitor elements of both the low pass filters LPF1 and LPF2 may be configured as chip components and mounted on the surface of the wiring board 2.

In the wiring board 2, the mounting electrode connected to the power terminal VDD of the switch IC 3 is connected to the outer electrode VDDa via the wiring electrode and the via-conductor, and the plurality of mounting electrodes connected to the corresponding terminals of the control terminals VC1 to VC4 of the switch IC 3 are connected to their respective corresponding outer electrodes VC1a to VC4a via the wiring electrode and the via-conductor, thus driving the switch IC 3 using power and control signals supplied from an external mother board or the like.

The chip components 5 include chip inductors L1 and L2 and a chip capacitor C1. By mounting these chip components 5 on the surface of the wiring board 2, the matching circuit 11 that performs impedance matching between the external first antenna 4a and the common terminal ANT of the switch IC 3 is provided. As an alternative configuration, part or all the chip inductors L1 and L2 and the chip capacitor C1 may be disposed on the wiring board 2.

The switch IC 3 preferably is a semiconductor element composed of Si, GaAs, or the like, for example. The switch IC 3 includes the common terminal ANT connected to the outer electrode ANTa located on the back surface of the wiring board 2, a plurality of the individual terminals 6 connected to their respective corresponding signal paths SL1 to SL10, a switch portion 7 that selectively switches and connects the common terminal ANT to one of the individual terminals 6, and the power terminal VDD and the control terminals VC1 to VC4 configured to receive supply of the power and the control signals to the switch IC 3. The switch IC 3 is mounted on the wiring board 2 by well-known surface mount technology, for example.

As illustrated in FIG. 3, the switch portion 7 includes a plurality of first switches 7a (eight in this preferred embodiment) and a plurality of second switches 7b (two in this preferred embodiment). Each first switch 7a is connected to the common terminal ANT at one end portion within the switch IC 3 and connected to the corresponding individual terminal 6 at the other end portion. Each second switch 7b is connected to the common terminal ANT via the connection wiring electrode 8 provided on the wiring board 2 at one end portion and connected to the corresponding individual terminal 6 within the switch IC 3 at the other end portion. In the present preferred embodiment, the switches 7a and 7b each preferably include a plurality of field effect transistors (FETs).

In this case, all the one end portions of the first switches 7a are connected to the common terminal ANT, and are also connected to each other via internal wiring electrodes of the switch IC 3. Whereas all the one end portions of the second switches 7b are not connected to any one of the one end portions of the first switches 7a within the switch IC 3, and not connected to the common terminal ANT within the switch IC 3.

Further, as illustrated in FIG. 3, in the switch IC 3, two additional connection terminals Z1 and Z2 are provided. The one end portions of the two second switches 7b are connected to the connection terminal Z2 that serves as a meeting point via internal wiring electrodes of the switch IC 3. Further, the connection terminal Z1 is connected to the common terminal ANT and all the one end portions of the first switches 7a. Further, both the connection terminals Z1 and Z2 are connected to each other via the connection wiring electrode 8 located on the wiring board 2. Thus, all the one end portions of the second switches 7b are not directly connected to the common terminal ANT within the switch IC 3, but connected to the common terminal ANT via the connection wiring electrode 8 located on the wiring board 2.

In the path connecting both the connection terminals Z1 and Z2 to each other, that is, in the path connecting the common terminal ANT and both the second switches 7b, a low pass filter LPF3 is an example of a filter circuit that attenuates harmonic components of communication signals transmitted through both the second switches 7b. The low pass filter LPF3 is a filter that attenuates harmonic components (second-order harmonics in this preferred embodiment) and the like of communication signals in Band 5 transmitted through the signal path SL6 and communication signals in Band 13 transmitted through the signal path SL7. The low pass filter LPF3 includes an inductor element UMLt1 and a capacitor element UMCt1 located on the wiring board 2. As an alternative configuration, the inductor element UMLt1 and capacitor element UMCt1 may be provided within the switch IC 3. The inductor element UMLt1 and the capacitor element UMCt1 may alternatively be configured as chip components, and the low pass filter LPF3 may be configured by mounting these chip components on the surface of the wiring board 2. The low pass filter LPF3 is not always necessary to be provided in the connection wiring electrode 8.

In some cases, the foregoing harmonic components are generated when a communication signal, particularly, a high power transmission signal flows through one of the switches 7a and 7b. For example, a reception signal in a frequency band of 1574.42 MHz to 1576.42 MHz is transmitted through the signal path SL8 connected to the individual terminal Rx1 as a communication signal from GPS, and a transmission signal in Band 13 (uplink frequency: 777 MHz to 787 MHz) is transmitted through the signal path SL7 connected to the individual terminal TRx3. In this case, harmonics (for example, second-order harmonics: 1554 MHz to 1574 MHz) of the communication signal transmitted through the signal path SL7 become close to the frequency band of the reception signal transmitted through the signal path SL8. Thus, if harmonics are generated at the second switch 7b connected to the signal path SL7 and these harmonics leak to the signal path SL8 through which the reception signal from GPS is transmitted, the reception sensitivity of GPS may degrade.

In view of this, the present preferred embodiment is configured in such a way that the signal path SL8 through which the reception signal from GPS is transmitted is connected to the first switch 7a and the signal path SL7 through which the communication signal (transmission and reception signals) in Band 13 is transmitted is connected to the second switch 7b. Here, the one end portion of the second switch 7b is not connected to any one of the first switches 7a and the common terminal ANT within the switch IC 3. This configuration enables to avoid leaking of the harmonics caused by connecting both the switches 7a and 7b to each other at their one end portions within the switch IC 3, thus preventing degradation of communication characteristics.

The present invention is not limited to particular configurations so long as, of a plurality of communication signals in different frequency bands, at least the communication signals that may likely to interfere with each other are transmitted separately through the signal path connected to the first switch 7a and the signal path connected to the second switch 7b. The other communication signals may be transmitted through any one of the signal paths connected to the first switches 7a and the signal paths connected to the second switches 7b.

Further, the numbers of the first switches 7a and the second switches 7b are not limited to particular values, and may be arbitrary changed depending on the number of communication signals to be handled and conditions of their frequency bands. For example, in the present preferred embodiment, only the switch through which the communication signal in Band 13 (signal path SL7), which is particularly likely to interfere with the reception signal (signal path SL8) of GPS, is transmitted may be formed as the second switch 7b, and the switch through which the communication signal in Band 5 (signal path SL6) is transmitted may be provided as the first switch 7a. In this case, one end portion of the switch connected to the signal path SL6 may be connected to the one end portions of the other first switches 7a and the common terminal ANT within the switch IC 3, as is the case with the other first switches 7a.

Further, the one end portions of both the second switches 7b are connected to the connection terminal Z2 that is provided within the switch IC 3 and serves as the meeting point, and further connected to the common terminal ANT by connecting the connection terminal Z2 and the connection terminal Z1 via the shared connection wiring electrode 8 located on the wiring board 2. Alternatively, an individual connection wiring electrode 8 may be provided for each second switch 7b, and the one end portions of both the second switches 7b may respectively be connected to the common terminal ANT via the individual connection wiring electrodes 8. For example, in this case, a new connection terminal may be provided within the switch IC 3 and connected to one end portion of the second switch 7b corresponding to the individual terminal TRx3, and this new connection terminal and the common terminal ANT may be connected via another connection wiring electrode 8 provided on the wiring board 2.

Further, the one end portions of both the second switches 7b may be connected to the common terminal ANT by not connecting one end portion of the connection wiring electrode 8 located on the wiring board 2 to the connection terminal Z1, but by connecting that end portion to a wiring electrode connecting the common terminal ANT and the outer electrode ANTa at an arbitrary position. In this case, there is no need to form the connection terminal Z1.

A wireless communication equipment 50 including the switching module 1 is, for example, a cellular phone, and, as illustrated in FIG. 2, includes first and second antennas 4a and 4b, the switching module 1, and a reception module 20.

In this case, an outer electrode ANTb of the reception module 20 that constitutes the wireless communication equipment 50 is connected to the second antenna 4b and a low pass filter 21. The low pass filter 21 is connected to a SAW filter 22, and the SAW filter 22 is connected to an input terminal of a low noise amplifier LNA 23. An output terminal of the low noise amplifier LNA 23 is connected to a SAW filter 24, and an output terminal of the SAW filter 24 is connected to an outer electrode Rb provided in the reception module 20. The SAW filters 22 and 24 are filters whose passbands include frequencies of the communication signals received with the second antenna 4b. Further, signals transmitted through the reception module 20 are communication signals in frequency bands that, for the most part, overlaps with frequency bands of harmonic components of a communication signal (for example, Band 13) transmitted through the second switch 7b of the switching module 1.

In the wireless communication equipment that is configured as described above, the harmonic components of communication signals transmitted through the second switch 7b of the switching module 1 are attenuated with the low pass filter LPF3. Thus, the harmonic components are prevented from being inputted to the reception module 20 via the second antenna 4b. Accordingly, this ensures preferable communication characteristics of communication signals transmitted through both the antennas 4a and 4b.

The module connected to the second antenna 4b is not limited to the reception module 20, and may be any module that handles transmission or reception of communication signals.

Accordingly, the foregoing preferred embodiment enables the single switch IC 3 to selectively switch and connect the common terminal ANT to one of the signal paths SL1 to SL10 through which communication signals of different frequency bands are transmitted. Thus, the switching module 1 is able to be downsized and simplified, compared with configurations in which switch portions are respectively provided for different bands.

Further, in the foregoing preferred embodiment, the reception signals from GPS are transmitted through the signal path SL8 connected to the first switch 7a, and the transmission signal (Band 13) whose harmonics are close to the reception signals is transmitted through the signal path SL7 connected to the second switch 7b. Thus, even in the case where harmonics are generated at the second switch 7b, the harmonics are transmitted to the common terminal ANT of the switch IC 3 via the connection wiring electrode 8 located on the wiring board 2. Accordingly, compared with the case where the switches 7a and 7b are each connected to each other at their one end portions within the switch IC 3, the amount of leaking of the harmonics to the signal path SL8 is significantly reduced. This prevents degradation of GPS reception sensitivity caused by the harmonics of the communication signal in Band 13 that leak to the signal path SL8 through which the reception signals from GPS are transmitted.

Further, in the path connecting both the connection terminals Z1 and Z2 to each other, the low pass filter LPF3 that attenuates the harmonics of the communication signal in Band 13 is provided. This attenuates the harmonics while transmitting through the connection wiring electrode 8, thus further improving the effect of preventing the harmonics of the communication signal in Band 13 from leaking to the signal path SL8.

Further, the low pass filter LPF3 is provided in the connection wiring electrode 8 that connects the common terminal ANT and the second switches 7b, and the second switches 7b are not connected to any one of the one end portions of the first switches 7a and the common terminal ANT within the switch IC 3. This does not cause such an adverse effect that the low pass filter LPF3 provided to attenuate harmonics of communication signals in Band 13 and Band 5 may also attenuate the communication signal (for example, reception signals from GPS (signal path SL8) or the communication signal in Band 2 (Signal path SL4)), whose frequency band is close to the harmonics and which is transmitted through one of the first switches 7a. In other words, only the harmonics of the communication signal transmitted through a target switch 7b may be attenuated without degrading communication characteristics of the communication signals transmitted through other switches 7a.

In this way, even in the case where switch portions, which are separately provided for different bands in conventional art, are configured with the single switch IC 3, mutual interference of communication signals between different bands may be prevented. Thus, downsizing and simplification of the switching module 1 as well as prevention of the mutual interference of communication signals between different bands are achieved together.

Further, the switches 7a and 7b each preferably include field effect transistors. Thus, various preferred embodiments of the present invention may be applied to switch ICs in which each switch preferably includes field effect transistors.

Second Preferred Embodiment

Figure 4:
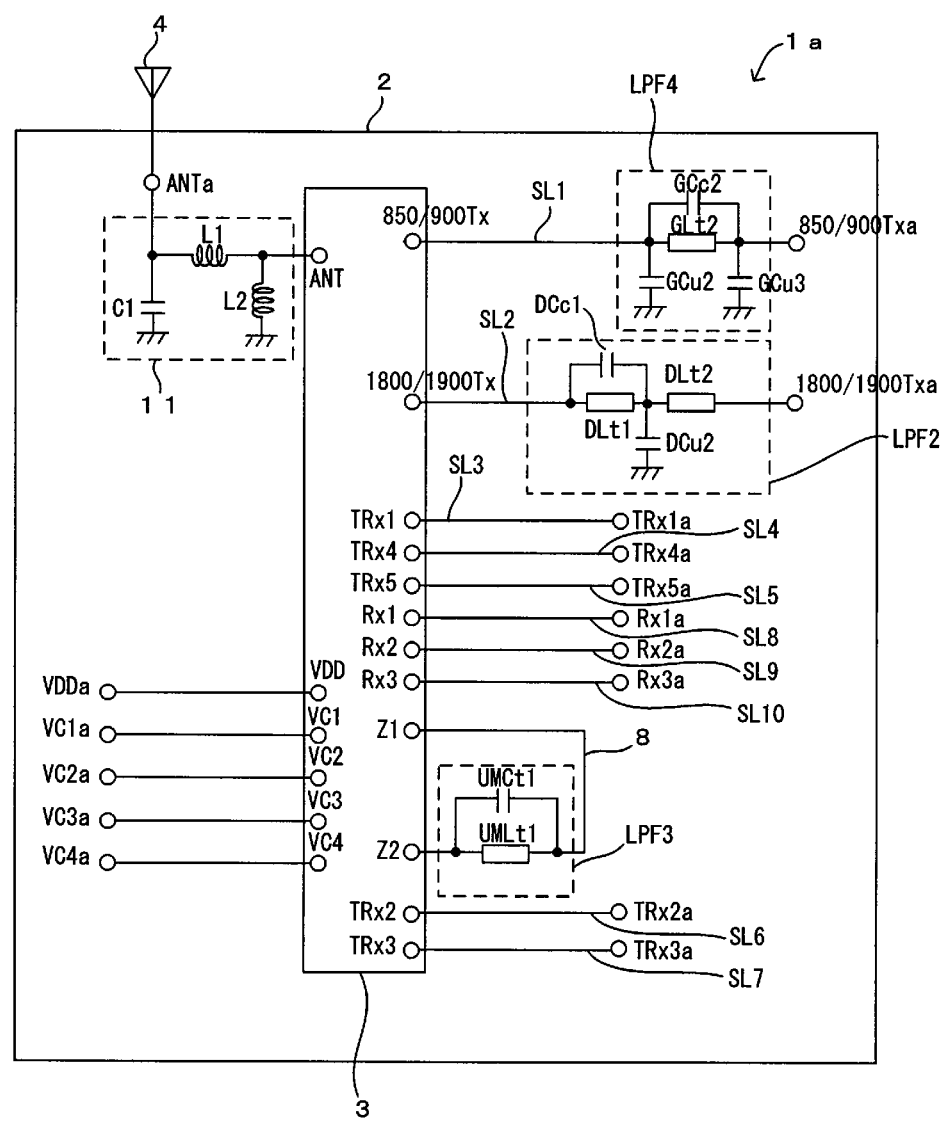
FIG. 4 is a circuit configuration diagram of a switching module according to a second preferred embodiment of the present invention.
Figure 5:
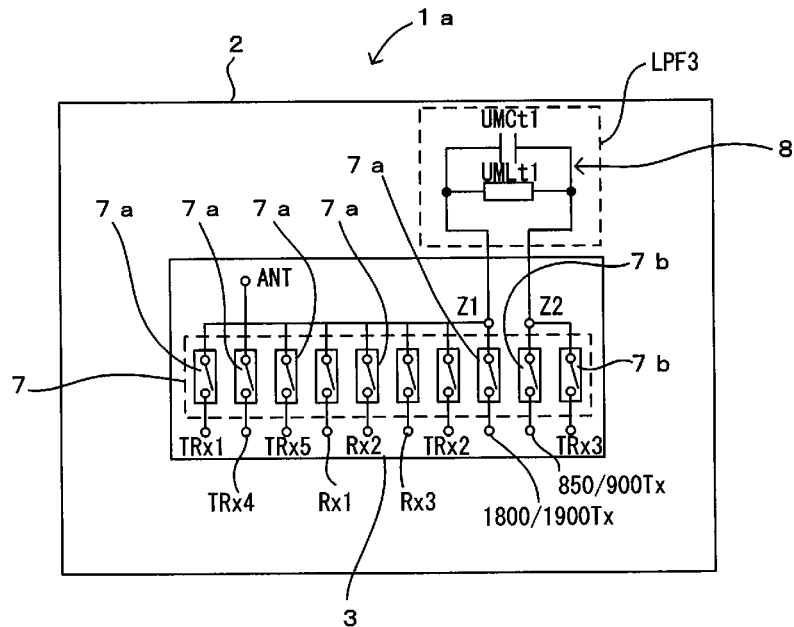
FIG. 5 is a view illustrating internal structure of a switch IC of FIG. 4.

A switching module 1a according to a second preferred embodiment of the present invention is described with reference to FIG. 4 and FIG. 5. FIG. 4 is a circuit configuration diagram of the switching module 1a, and FIG. 5 is a view illustrating the internal structure of a switch IC 3 included in the switching module 1a. For ease of description, in FIG. 5, portions of wiring electrodes located on the wiring board 2, the control terminals VC1 to VC4 of the switch IC 3, the power terminal VDD, and the like are not illustrated in the drawings.

The switching module 1a according to the present preferred embodiment differs from the switching module 1 of the first preferred embodiment described with reference to FIG. 1 to FIG. 3 in that, as illustrated in FIG. 4 and FIG. 5, the individual terminal 850/900Tx connected to the first switch 7a and the individual terminal TRx2 connected to the second switch 7b are switched, and in that the configuration of the low pass filter LPF1 provided in the signal path SL1 is modified. The remaining configuration elements are preferably the same or substantially the same as those in the first preferred embodiment. Thus, the same reference numerals are assigned to the identical elements to avoid redundant description.

As illustrated in FIG. 5, in this case, the individual terminal 850/900Tx that was connected to the first switch 7a is now connected to the signal path SL6 as the individual terminal TRx2 whereas the individual terminal TRx2 that was connected to the second switch 7b is now connected to the signal path SL1 as the individual terminal 850/900Tx, thus switching the individual terminals 850/900Tx and TRx2 for use. Further, one end portion of the second switch 7b connected to the individual terminal 850/900Tx thus switched is connected to the common terminal ANT via the connection wiring electrode 8 in which the low pass filter LPF3 is provided.

Further, as illustrated in FIG. 4, a low pass filter LPF4 provided in the signal path SL1 includes elements GLt2, GCc2, GCu2, and GCu3, which are partial members of the elements GLt1, GLt2, GCc1, GCc2, GCu1, GCu2, and GCu3 constituting the low pass filter LPF1 of the first preferred embodiment. The low pass filter LPF4 attenuates the third-order harmonics of communication signals in the 850 MHz band and the 900 MHz band transmitted through the signal path SL1.

Further, the low pass filter LPF3 provided in the connection wiring electrode 8 is provided as a filter that attenuates the second-order harmonic of a communication signal in the Band 13 transmitted through the signal path SL7 and the second-order harmonics of communication signals in the 850 MHz band and the 900 MHz band transmitted through the signal path SL1.

Connecting the individual terminal 850/900Tx, which is connected to the signal path SL1, to the second switch 7b allows the low pass filter LPF3 provided in the connection wiring electrode 8 to perform the function of attenuating the second-order harmonics, substituting a portion of the functions of attenuating the second-order harmonics and the third-order harmonics included in the low pass filter LPF1 in the first preferred embodiment. This simplifies the configuration of the low pass filter LPF4.

Third Preferred Embodiment

Figure 6:
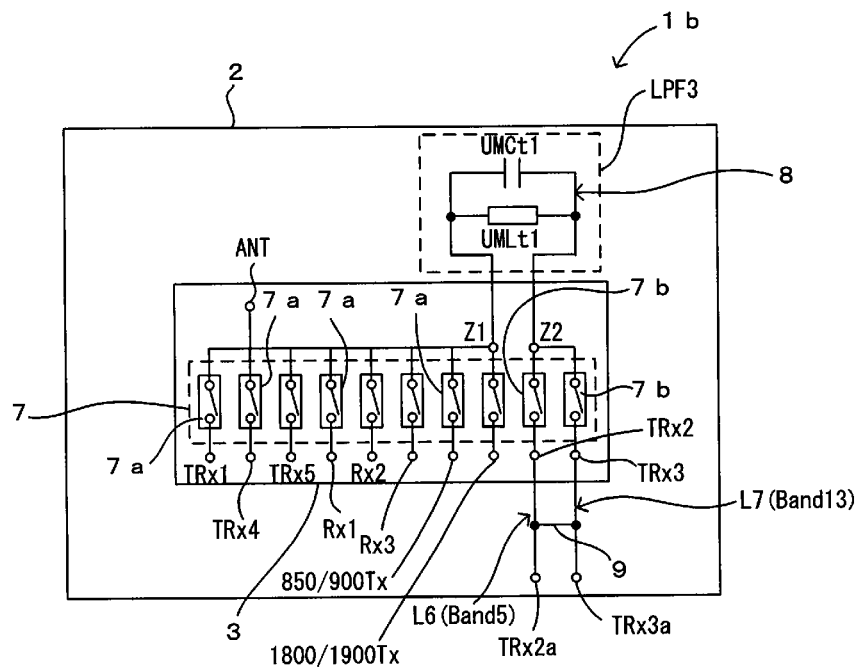
FIG. 6 is a view illustrating a switching module according to a third preferred embodiment of the present invention.

A switching module 1b according to a third preferred embodiment of the present invention is described with reference to FIG. 6. FIG. 6 is a view illustrating the internal structure of a switch IC 3 included in the switching module 1b. For ease of description, in FIG. 6, configuration elements such as the control terminals VC1 to VC4 and the power terminal VDD in the switch IC 3, the low pass filters LPF1 and LPF2 located on the wiring board 2, the signal paths SL1 to SL5 and SL8 to SL10, which are the remaining paths other than the signal path SL6 and the signal path SL7, and the like are not illustrated in the drawing.

The switching module 1b according to the present preferred embodiment differs from the switching module 1 of the first preferred embodiment described with reference to FIG. 1 to FIG. 3 in that, as illustrated in FIG. 6, the two second switches 7b are connected in parallel. The remaining configuration elements are preferably the same or substantially the same as those in the first preferred embodiment. Thus, the same reference numerals are assigned to the identical elements to avoid redundant description.

In this case, both the second switches 7b are connected in parallel by connecting both the signal path SL6 and the signal path SL7, which are connected to their respective second switches 7b, via a wiring electrode 9 located on the wiring board 2. Further, both the second switches 7b are used as switches for the communication signal in the Band 13. In the present preferred embodiment, the communication signal in the Band 5 used in the first preferred embodiment is not used.

According to the foregoing configuration, load voltages of the respective second switches 7b connected in parallel are lowered compared with the case where a communication signal is transmitted through the single second switch 7b. This suppresses spurious signals such as harmonics and the like generated at the time of transmitting the communication signal in the Band 13 through the second switch.

In a case where the wiring electrode 9 that connects both the second switches 7b in parallel is located directly below the switch IC 3 (for example, the front surface (top layer) of the wiring board or a layer just below the top layer), there is no need to provide a path segment (wiring electrode and via-conductor) in the signal path SL6 from the position at which the signal path SL6 is connected to the wiring electrode 9 to the back surface (outer electrode TRx2a). This facilitates simplification of the wiring configuration of the wiring board 8.

Further, in a case where the wiring electrode 9 connecting both the second switches 7b in parallel is provided on a layer where the outer electrode TRx2a is located or a nearby layer such as the back surface (bottom layer) of the wiring board 8, a layer just above the bottom layer, or the like, the signal path SL6 used for the communication signal in the Band 5 becomes usable as an effective signal path by simply removing the wiring electrode 9. It is practical since this allows to use the ten signal paths as is the case with the first preferred embodiment.

Fourth Preferred Embodiment

Figure 7:
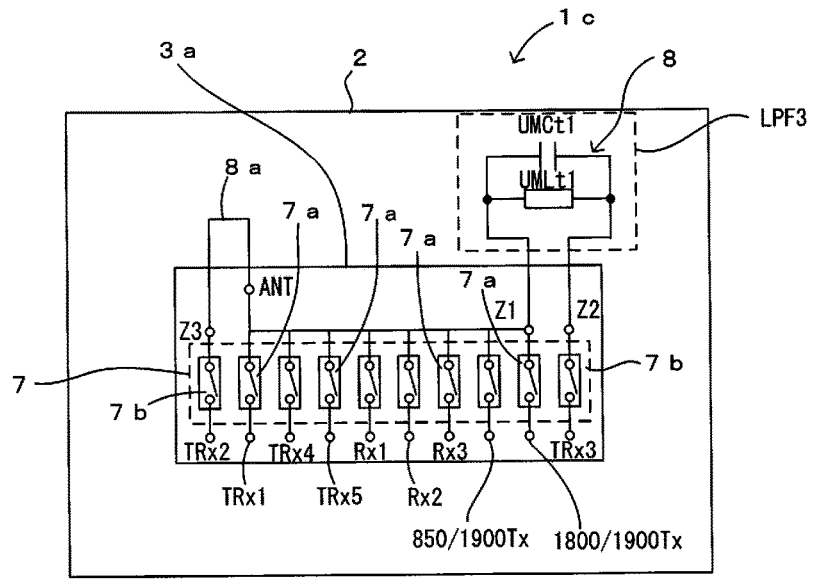
FIG. 7 is a view illustrating a switching module according to a fourth preferred embodiment of the present invention.
Figure 8:
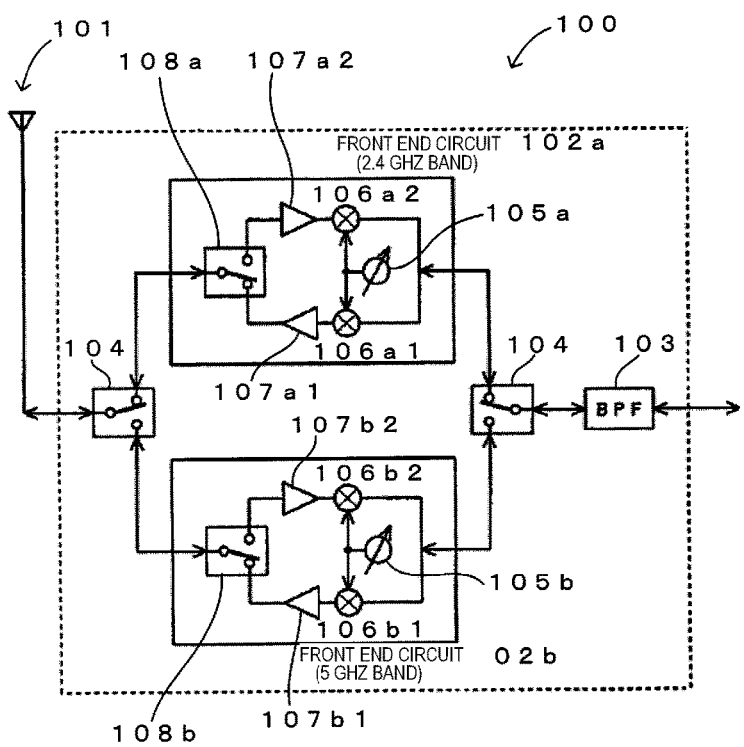
FIG. 8 is a circuit configuration diagram of a conventional switching module.

A switching module 1c according to the fourth preferred embodiment of the present invention is described with reference to FIG. 7. FIG. 7 is a view illustrating the internal structure of a switch IC 3a included in the switching module 1c. For ease of description, in FIG. 7, configuration elements other than the switch IC 3a, connection wiring electrodes 8 and 8a, and the low pass filter LPF3 are not illustrated in the drawing. Further, the control terminals VC1 to VC4 and the power terminal VDD in the switch IC 3a are also not illustrated in the drawing.

The switching module 1c according to the present preferred embodiment differs from the switching module 1 of the first preferred embodiment described with reference to FIG. 1 to FIG. 3 in that, as illustrated in FIG. 7, one end portion of the second switch 7b connected to the individual terminal TRx2 and one end portion of the second switch 7b connected to the individual terminal TRx3 are independent, and in that the common terminal ANT and one end portion of the second switch 7b connected to the individual terminal TRx2 are connected via the connection wiring electrode 8a that is different from the connection wiring electrode 8 that connects the common terminal ANT and one end portion of the second switch 7b connected to the individual terminal TRx3. The remaining configuration elements are preferably the same or substantially the same as those in the first preferred embodiment. Thus, the same reference numerals are assigned to the identical elements to avoid redundant description.

In this case, one end portion of the second switch 7b connected to the individual terminal TRx2 is connected to a connection terminal Z3 provided in the switch IC 3 via an internal wiring electrode, and the connection terminal Z3 and the common terminal ANT is connected via the connection wiring electrode 8a provided on the wiring board 2, thus connecting the common terminal ANT and the one end portion of the second switch 7b connected to the individual terminal TRx2. As an alternative configuration, the common terminal ANT and the one end portion of the second switch 7b connected to the individual terminal TRx2 may be connected by connecting an end portion of the connection wiring electrode 8a, which is on the side opposite to the end portion connected to the connection terminal Z3, to a wiring electrode connecting the common terminal ANT located on the wiring board 2 and the outer electrode ANTa at an arbitrary position.

By making the second switch 7b connected to the individual terminal TRx2 independent as described above, the end portion of the second switch 7b is able to be connected to the common terminal ANT without having the low pass filter LPF3 in between. Further, if necessary, another low pass filter may be provided in the connection wiring electrode 8a to attenuate harmonics of the communication signal in the Band 5 transmitted through the signal path SL6. Further, the communication signal in the Band 5 transmitted through the signal path SL6 and the communication signal in the Band 13 transmitted through the signal path SL7 may be switched by providing the low pass filter LPF3 on the connection wiring electrode 8 side. Accordingly, the switch IC 3a enables performance of various modifications in the wiring structure of the wiring board 2. Thus, there is no need to redesign the switch IC 3a in response to a design change in the switching module 1c, and the manufacturing cost of the switching module 1c is reduced.

The present invention is not limited to the foregoing preferred embodiments, and various modifications other than the foregoing ones may be made within the scope of the present invention.

For example, in the foregoing preferred embodiments, the switches 7a and 7b each preferably include field effect transistors. Alternatively, the switches 7a and 7b may each include various transistors such as bipolar transistors, electrostatic induction type transistors, and the like. Further, the first switch 7a may alternatively include a plurality of elements such as resistor elements, capacitor elements, field effect transistors, and the like.

Further, preferred embodiments of the present invention may be applicable to various switching modules in which switch ICs are mounted on wiring boards.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching module comprising:
   a plurality of signal paths that transmit and receive a plurality of communication signals in different frequency bands;
   a wiring board; and
   a switch IC mounted on the wiring board, the switch IC including a common terminal, a plurality of individual terminals connected to respective corresponding ones of the plurality of signal paths, and a switch portion that selectively switches and connects the common terminal to one of the plurality of individual terminals; wherein
   the switch portion includes:
      a plurality of first switches, in which, within the switch IC, one end portion of each of the plurality of first switches is connected to the common terminal and another end portion of each of the plurality of first switches is connected to each of the plurality of corresponding individual terminals; and
      at least one second switch, which is not connected to the plurality of first switches within the switch IC, and in which one end portion of the at least one second switch is connected to the common terminal through a connection wiring electrode provided on the wiring board and another end portion of the at least one second switch is connected to each of the plurality of corresponding individual terminals, within the switch IC.

2. The switching module according to claim 1, wherein each of the plurality of communication signals includes one communication signal in which a harmonic component thereof interferes with another of the plurality of communication signals; and
   the one communication signal is transmitted through one of the plurality of the signal paths, which is connected to the second switch and the another of the plurality of communication signals is transmitted through one of the plurality of the signal paths, which is connected to the respective first switches.

3. The switching module according to claim 2, wherein a filter circuit that attenuates the harmonic component of the one communication signal is provided in a path connecting the common terminal and the second switch through which the one communication signal is transmitted.

4. The switching module according to claim 1, wherein the switch IC includes a plurality of second switches; and at least two of the plurality of second switches are connected in parallel.

5. The switching module according to claim 4, wherein the at least two of the plurality of second switches are connected in parallel by a wiring electrode provided on the wiring board.

6. The switching module according to claim 1, wherein each of the plurality of first switches and the at least one second switch includes a field effect transistor.

7. The switching module according to claim 1, wherein each of the plurality of signal paths include a wiring electrode and a via-conductor.

8. The switching module according to claim 1, further comprising a chip inductor and a chip capacitor mounted in or on the wiring board.

9. The switching module according to claim 1, wherein each of the plurality of signal paths include a low pass filter.

10. A wireless communication equipment comprising:
the switching module according to claim 1; and
a first antenna and a second antenna; wherein
the first antenna transmits and receives at least one of the plurality of communication signals; and
the second antenna transmits and receives a communication signal that interferes with a harmonic component of the at least one of the plurality of communication signals.

11. The wireless communication equipment according to claim 10, wherein the wireless communication equipment is a cellular phone.

12. The wireless communication equipment according to claim 10, wherein
each of the plurality of communication signals includes one communication signal in which a harmonic component thereof interferes with another of the plurality of communication signals; and
the one communication signal is transmitted through one of the plurality of the signal paths, which is connected to the second switch and the another of the plurality of communication signals is transmitted through one of the plurality of the signal paths, which is connected to the respective first switches.

13. The wireless communication equipment according to claim 12, wherein a filter circuit that attenuates the harmonic component of the one communication signal is provided in a path connecting the common terminal and the second switch through which the one communication signal is transmitted.

14. The wireless communication equipment according to claim 10, wherein
the switch IC includes a plurality of second switches; and
at least two of the plurality of second switches are connected in parallel.

15. The wireless communication equipment according to claim 14, wherein the at least two of the plurality of second switches are connected in parallel by a wiring electrode provided on the wiring board.

16. The wireless communication equipment according to claim 10, wherein each of the plurality of first switches and the at least one second switch includes a field effect transistor.

17. The wireless communication equipment according to claim 10, wherein each of the plurality of signal paths include a wiring electrode and a via-conductor.

18. The wireless communication equipment according to claim 10, further comprising a chip inductor and a chip capacitor mounted in or on the wiring board.

19. The wireless communication equipment according to claim 10, wherein each of the plurality of signal paths include a low pass filter, or a wiring electrode and a via-conductor.

* * * * *